(12) United States Patent
Kim

(10) Patent No.: US 11,571,959 B2
(45) Date of Patent: Feb. 7, 2023

(54) POWER TRANSMISSION DEVICE FOR HYBRID VEHICLE

(71) Applicant: Hyundai Transys Inc., Hwaseong-si (KR)

(72) Inventor: Tae Hoon Kim, Hwaseong-si (KR)

(73) Assignee: Hyundai Transys Inc., Hwaseong-si (KR)

( * ) Notice: Subject to any disclaimer, the term of this patent is extended or adjusted under 35 U.S.C. 154(b) by 0 days.

(21) Appl. No.: 17/107,069

(22) Filed: Nov. 30, 2020

(65) Prior Publication Data

US 2021/0252961 A1 Aug. 19, 2021

(30) Foreign Application Priority Data

Feb. 19, 2020 (KR) .................. 10-2020-0020371

(51) Int. Cl.
*B60K 6/22* (2007.10)
*B60K 6/26* (2007.10)
*B60K 6/38* (2007.10)
*B60K 6/44* (2007.10)

(52) U.S. Cl.
CPC .................. *B60K 6/22* (2013.01); *B60K 6/26* (2013.01); *B60K 6/38* (2013.01); *B60K 6/44* (2013.01); *B60K 2006/268* (2013.01); *B60Y 2200/92* (2013.01); *B60Y 2400/46* (2013.01); *B60Y 2400/48* (2013.01)

(58) Field of Classification Search
CPC ... B60K 6/22; B60K 6/26; B60K 6/38; B60K 6/44; B60K 6/36; B60K 6/48; B60K 6/24; B60K 6/00; B60K 6/20; B60K 2006/262; B60K 2006/268; B60K 2006/4825; B60K 1/02; B60Y 2200/92; B60Y 2400/46; B60Y 2400/48
See application file for complete search history.

(56) References Cited

U.S. PATENT DOCUMENTS

| | | | | |
|---|---|---|---|---|
| 5,934,395 A | * | 8/1999 | Koide ..................... | F02N 11/04 903/905 |
| 6,155,364 A | * | 12/2000 | Nagano .................. | H02K 7/006 180/65.235 |
| 6,862,887 B2 | * | 3/2005 | Noreikat .................. | B60K 6/40 60/716 |

(Continued)

FOREIGN PATENT DOCUMENTS

| JP | 2013-052857 A | 3/2013 |
|---|---|---|
| JP | 6112229 B2 | 4/2017 |

(Continued)

OTHER PUBLICATIONS

Office Action dated Feb. 10, 2021 in Korean Application No. 10-2020-0020371.

*Primary Examiner* — James M Dolak
(74) *Attorney, Agent, or Firm* — Saliwanchik, Lloyd & Eisenschenk

(57) ABSTRACT

A power transmission device for a hybrid vehicle may include: an engine part; a transfer part configured to transfer power of the engine part; a motor part configured to provide power to the transfer part, and driven when power is applied thereto; and a plurality of torsion damper parts disposed between the engine part and the motor part, and connected in series.

6 Claims, 4 Drawing Sheets

(56) References Cited

U.S. PATENT DOCUMENTS

| | | | | |
|---|---|---|---|---|
| 7,240,751 B2 * | 7/2007 | Hoare | ............ | B60K 6/48 |
| | | | | 180/65.25 |
| 7,753,149 B2 * | 7/2010 | Tabata | ............ | F16H 3/666 |
| | | | | 180/65.245 |
| 7,954,578 B2 * | 6/2011 | Kim | ............ | B60K 6/547 |
| | | | | 180/65.21 |
| 7,992,661 B2 * | 8/2011 | Nomura | ............ | B60W 10/06 |
| | | | | 180/65.21 |
| 8,091,659 B2 * | 1/2012 | Luo | ............ | B60W 10/02 |
| | | | | 180/65.285 |
| 8,256,562 B2 * | 9/2012 | Robinette | ............ | B60K 17/24 |
| | | | | 180/300 |
| 8,256,862 B2 * | 9/2012 | Takagi | ............ | B41J 2/145 |
| | | | | 347/14 |
| 8,485,930 B2 * | 7/2013 | Robinette | ............ | B60W 10/113 |
| | | | | 475/5 |
| 8,491,438 B2 * | 7/2013 | Kim | ............ | B60K 6/547 |
| | | | | 475/5 |
| 8,585,541 B2 * | 11/2013 | Mueller | ............ | B60K 6/40 |
| | | | | 477/3 |
| 8,621,957 B2 * | 1/2014 | Moser | ............ | B60K 6/48 |
| | | | | 74/661 |
| 8,840,523 B2 * | 9/2014 | Tajima | ............ | B60K 6/387 |
| | | | | 477/5 |
| 9,114,699 B2 * | 8/2015 | Takei | ............ | B60K 6/445 |
| 9,156,346 B2 * | 10/2015 | Choi | ............ | B60K 6/44 |
| 9,233,685 B2 * | 1/2016 | Kanayama | ............ | F16D 3/12 |
| 9,260,110 B2 * | 2/2016 | Tamura | ............ | B60W 10/04 |
| 9,340,098 B2 * | 5/2016 | Choi | ............ | B60K 6/445 |
| 9,370,993 B2 * | 6/2016 | Chen | ............ | B60W 20/30 |
| 9,631,709 B2 * | 4/2017 | Scholle | ............ | F16H 3/725 |
| 9,701,189 B2 * | 7/2017 | Lee | ............ | B60K 6/365 |
| 9,764,631 B2 * | 9/2017 | Kim | ............ | B60K 6/36 |
| 9,772,028 B2 * | 9/2017 | Schoenek | ............ | F16H 57/0476 |
| 9,915,322 B2 * | 3/2018 | Kim | ............ | F16H 3/666 |
| 10,293,767 B2 * | 5/2019 | Lee | ............ | B60R 16/03 |
| 10,352,404 B2 * | 7/2019 | Beck | ............ | B60K 6/365 |
| 10,479,183 B2 * | 11/2019 | Nishida | ............ | B60K 6/442 |
| 11,332,116 B2 * | 5/2022 | Hoesl | ............ | F02N 11/003 |
| 11,338,661 B2 * | 5/2022 | Beck | ............ | B60K 6/445 |
| 11,338,662 B2 * | 5/2022 | Zhang | ............ | B60K 6/46 |
| 11,339,734 B2 * | 5/2022 | Muta | ............ | B60W 20/15 |
| 11,345,228 B2 * | 5/2022 | Beck | ............ | B60K 6/387 |
| 11,358,476 B2 * | 6/2022 | Matsubara | ............ | B60L 15/20 |
| 11,364,784 B2 * | 6/2022 | Kaltenbach | ............ | B60K 6/547 |
| 11,364,785 B2 * | 6/2022 | Roske | ............ | F16D 21/00 |
| 11,420,513 B2 * | 8/2022 | Hummel | ............ | F16H 3/089 |
| 2008/0000746 A1 * | 1/2008 | Schiele | ............ | B60K 6/547 |
| | | | | 192/3.54 |
| 2011/0098151 A1 * | 4/2011 | Ziemer | ............ | B60K 6/485 |
| | | | | 180/65.265 |
| 2013/0138283 A1 * | 5/2013 | Cho | ............ | B60W 10/08 |
| | | | | 180/65.265 |
| 2013/0145898 A1 * | 6/2013 | Kim | ............ | B60K 6/442 |
| | | | | 74/665 D |

FOREIGN PATENT DOCUMENTS

| | | |
|---|---|---|
| KR | 10-2009-0020791 A | 2/2009 |
| KR | 10-2013-0065392 A | 6/2013 |
| KR | 10-2013-0114059 A | 10/2013 |

* cited by examiner

POWER TRANSMISSION DEVICE FOR HYBRID VEHICLE

CROSS-REFERENCE TO RELATED APPLICATION

This application claims priority from and the benefit of Korean Patent Application No. 10-2020-0020371, filed on Feb. 19, 2020, which is hereby incorporated by reference for all purposes as if set forth herein.

BACKGROUND

Field

Exemplary embodiments of the present disclosure relate to a power transmission device for a hybrid vehicle, and more particularly, to a power transmission device for a hybrid vehicle, which can use a plurality of dampers to not only improve vibration absorption performance, but also reduce the size thereof, thereby reducing the whole length thereof.

Discussion of the Background

In general, a power transmission device for a hybrid vehicle has a layout in which an automatic transmission, a motor, an engine and an ISG (Integrated Starter & Generator) are arranged in a line.

A hybrid vehicle which uses an engine and motor is started by the motor. When the vehicle is driven at a predetermined speed, a generator, i.e. an ISG starts the engine in order to use an output of the engine and an output of the motor at the same time.

The motor used in the power transmission device for a hybrid vehicle may be driven for electric driving of the vehicle, when the engine is not driven at the initial stage.

Recently, a hybrid vehicle has been developed, which includes two or more motors installed therein, in addition to the hybrid vehicle including one motor installed therein. For example, when two motors are arranged in a power transmission device for a hybrid vehicle, a first motor may be driven to start an engine, and a second motor may be driven for electric driving of the vehicle.

In the conventional hybrid vehicle, however, a torsion damper which is necessarily used to absorb shock caused by drivability of the engine is disposed between the motor and the engine. Thus, the whole length of the power transmission device for a hybrid vehicle is increased, and a separate mass for supporting the torsion damper needs to be installed. Therefore, there is a need for a device capable of solving the problem.

The related art of the present disclosure is disclosed in Korean Patent Application No. 2009-0020791 published on Feb. 27, 2009 and entitled "Power Transmission Device for Hybrid Vehicle".

SUMMARY

Various embodiments are directed to a power transmission device for a hybrid vehicle, which can use a plurality of dampers to not only improve vibration absorption performance, but also reduce the size thereof, thereby reducing the whole length thereof.

In an embodiment, a power transmission device for a hybrid vehicle may include: an engine part; a transfer part configured to transfer power of the engine part; a motor part configured to provide power to the transfer part, and driven when power is applied thereto; and a plurality of torsion damper parts disposed between the engine part and the motor part, and connected in series.

The motor part may have a rotor part disposed therein, and the transfer part may be disposed on the rotation center axis of the rotor part.

The torsion damper parts may be disposed between the rotor part and the transfer part.

The torsion damper part may include: a first damper part disposed between the engine part and the motor part; and a second damper part disposed between the first damper part and the motor part. A clutch part which selectively connects the motor part and the transfer part may be disposed between the second damper part and the motor part.

The torsion damper part may include: a first damper part disposed between the engine part and the motor part; and a second damper part disposed between the first damper part and the motor part. A clutch part which selectively connects the motor part and the transfer part may be disposed between the first damper part and the second damper part.

The second damper part may be disposed in the first damper part.

The first and second damper parts may be connected in series to lower the overall elastic modulus of the torsion damper part.

The motor part may include: a first motor part driven to start the engine; and a second motor part driven to operate the vehicle. The torsion damper part may be disposed between the first and second motor parts.

The motor part may include: a first motor part driven to start the engine part; and a second motor part driven to operate the vehicle. The torsion damper part may be disposed between the engine part and the first motor part.

The first motor part may be disposed closer to the engine part than the second motor part, and the second motor part may provide a higher output than the first motor part.

In the power transmission device for a hybrid vehicle in accordance with the embodiment of the present disclosure, the plurality of torsion damper parts may be disposed between the engine part and the motor part, which makes it possible to reduce the whole length of the power transmission device. Furthermore, the torsion damper part may relieve shock applied to the engine part and the motor part, thereby lowering the overall stiffness thereof.

DETAILED DESCRIPTION OF THE ILLUSTRATED EMBODIMENTS

Hereinafter, a power transmission device for a hybrid vehicle will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
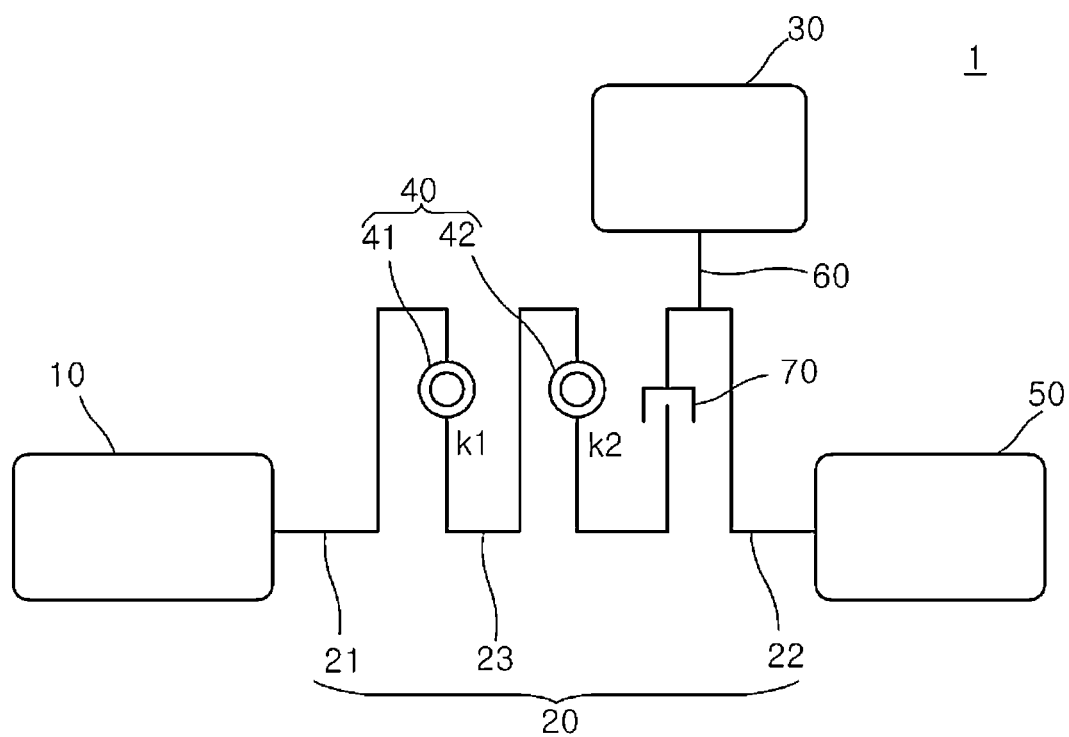
FIG. 1 is a block diagram schematically illustrating a power transmission device for a hybrid vehicle in accordance with a first embodiment of the present disclosure.
Figure 2:
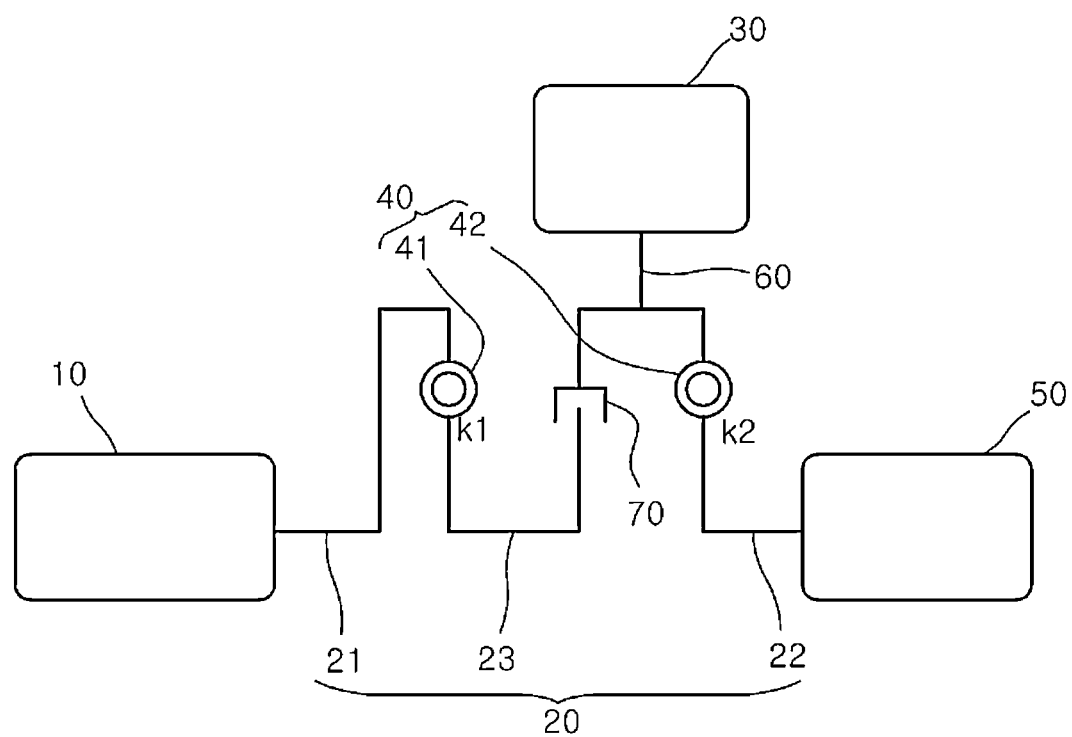
FIG. 2 is a block diagram schematically illustrating a power transmission device for a hybrid vehicle in accordance with a second embodiment of the present disclosure.
Figure 3:
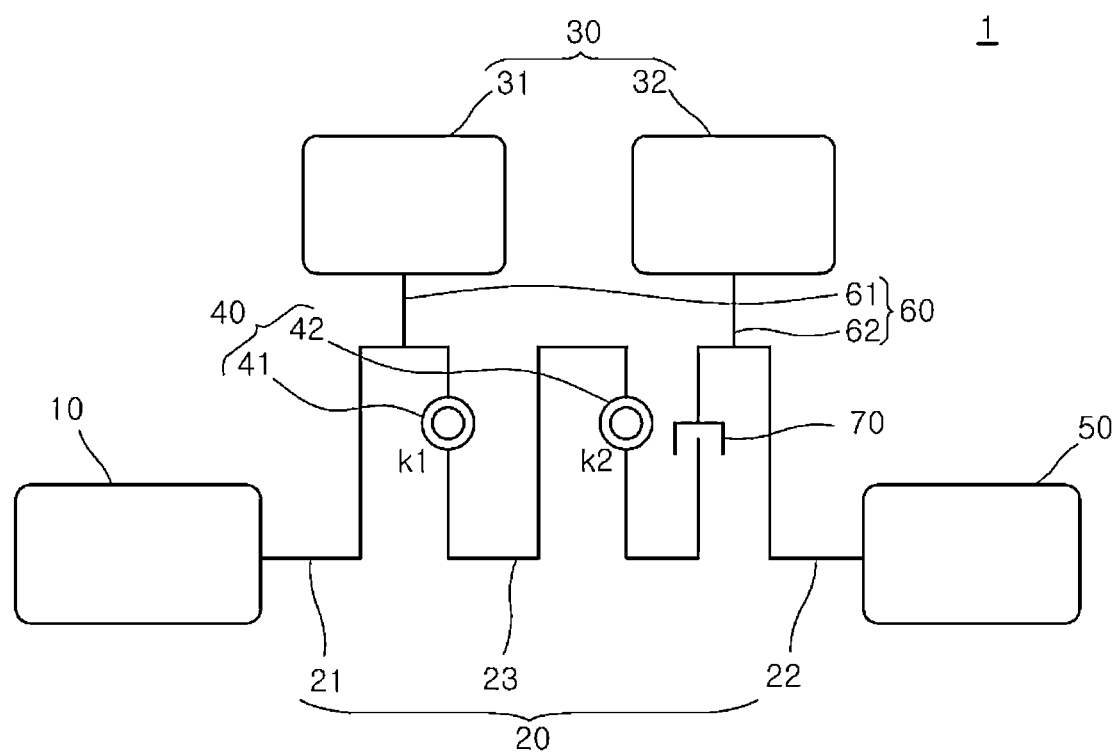
FIG. 3 is a block diagram schematically illustrating a power transmission device for a hybrid vehicle in accordance with a third embodiment of the present disclosure.

FIG. 1 is a block diagram schematically illustrating a power transmission device for a hybrid vehicle in accordance with a first embodiment of the present disclosure, and FIG. 2 is a block diagram schematically illustrating a power transmission device for a hybrid vehicle in accordance with a second embodiment of the present disclosure. FIG. 3 is a block diagram schematically illustrating a power transmission device for a hybrid vehicle in accordance with a third embodiment of the present disclosure, and FIG. 4 is a block diagram schematically illustrating a power transmission device for a hybrid vehicle in accordance with a fourth embodiment of the present disclosure.

Figure 4:
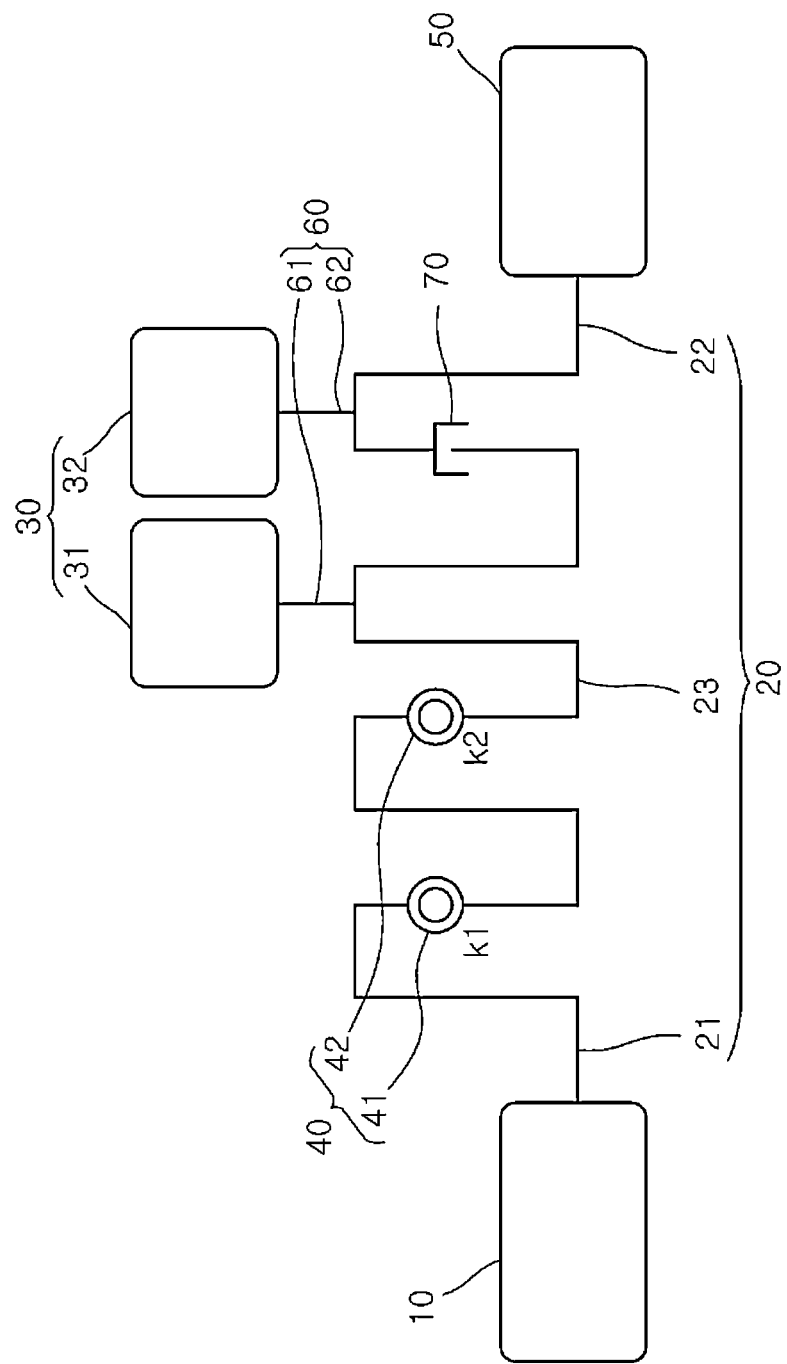
FIG. 4 is a block diagram schematically illustrating a power transmission device for a hybrid vehicle in accordance with a fourth embodiment of the present disclosure.

Referring to FIGS. 1 and 4, a power transmission device for a hybrid vehicle in accordance with an embodiment of the present disclosure includes an engine part 10, a transfer part 20, a motor part 30 and a torsion damper part 40.

The engine part 10 is an internal combustion engine which is driven to generate power, and the transfer part 20 transfers the power of the engine part 10. For example, the transfer part 20 may be formed in a shaft shape, and disposed through the motor part 30 and the torsion damper part 40. The transfer part 20 may have one end connected to the engine part 10 and the other end connected to a transmission part 50. The transfer part 20 may include first to third transfer shafts 21 to 23. The first transfer shaft 21 may be directly connected to the engine part 10, the second transfer shaft 22 may be directly connected to the transmission part 50, and the third transfer shaft 23 may be disposed between the first and second transfer shafts 21 and 22 so as to transfer power.

The motor part 30 provides power to the transfer part 20, and is driven when power is applied thereto. The power transmission device may use one or more motor parts 30. When a driving force of the motor part 30 is transferred, the vehicle may be driven even though the engine part 10 is not driven.

The torsion damper part 40 is disposed between the engine part 10 and the motor part 30. The power transmission device may include a plurality of torsion damper parts 40 connected in series. For example, a rotor part 60 may be disposed in the motor part 30, the transfer part 20 may be disposed on the rotation center axis of the rotor part 60, and the torsion damper part 40 may be disposed between the rotor part 60 and the transfer part 20, which makes it possible to reduce the whole length of the power transmission device 1 for a hybrid vehicle.

The power transmission device in accordance with the present embodiment may include one motor part 30. If necessary, the power transmission device may include a first motor part 31 and a second motor part 32.

The first motor part 31 is driven to start the engine part 10. For example, the first motor part 31 may be disposed closer to the engine part 10 than the second motor part 32.

The second motor part 32 is driven to operate the vehicle. For example, the second motor part 32 may be designed to have a larger capacity than the first motor part 31, in order to operate the vehicle. Thus, the second motor part 32 may provide a higher output than the first motor part 31.

At this time, the torsion damper part 40 may be disposed between the engine part 10 and the first motor part 31, or disposed between the first motor part 31 and the second motor part 32.

When the motor part 30 includes the first and second motor parts 31 and 32, the rotor part 60 may include a first rotor part 61 and a second rotor part 62.

The first rotor part 61 may be rotated by the first motor part 31, and coupled to the torsion damper part 40. The second rotor part 62 may be rotated by the second motor part 32, and selectively connected to a clutch part 70.

The torsion damper part 40 in accordance with the first embodiment of the present disclosure includes a first damper part 41 and a second damper part 42, and the clutch part 70 is disposed between the second damper part 42 and the motor part 30 (see FIG. 1).

That is, the first damper part 41 is disposed between the engine part 10 and the motor part 30, and the second damper part 42 is disposed between the first damper part 41 and the motor part 30. The clutch part 70 which selectively connects the motor part 30 and the transfer part 20 so as to transfer power is disposed between the second damper part 42 and the motor part 30.

For example, the first damper part 41 and the second damper part 42 may be connected to each other in series, and each include a spring to absorb vibration when power generated by the engine part 10 and the motor part 30 is transferred.

The torsion damper part 40 in accordance with the second embodiment of the present disclosure includes a first damper part 41 and a second damper part 42, and the clutch part 70 is disposed between the first damper part 41 and the second damper part 42 (see FIG. 2).

That is, the first damper part 41 is disposed between the engine part 10 and the motor part 30, and the second damper part 42 is disposed between the first damper part 41 and the motor part 30. The clutch part 70 which selectively connects the motor part 30 and the transfer part 20 so as to transfer power is disposed between the first damper part 41 and the second damper part 42.

For example, the first damper part 41 and the second damper part 42 may be connected to each other in series, and each include a spring to absorb vibration when power generated by the engine part 10 and the motor part 30 is transferred.

The torsion damper part 40 in accordance with the third embodiment of the present disclosure includes a first damper part 41 and a second damper part 42, and is disposed between the first motor part 31 and the second motor part 32 (see FIG. 3).

That is, the engine part 10, the first motor part 31, the second motor part 32 and the transmission part 50 are sequentially disposed, and the first and second damper parts 41 and 42 are disposed between the first and second motor parts 31 and 32. The clutch part 70 which selectively connects the second motor part 32 and the transfer part 20 so as to transfer power is disposed between the second damper part 42 and the second motor part 32.

For example, the first damper part 41 and the second damper part 42 may be connected to each other in series, and each include a spring to absorb vibration when power generated by the engine part 10 and the motor part 30 is transferred.

The torsion damper part 40 in accordance with the fourth embodiment of the present disclosure includes a first damper part 41 and a second damper part 42, and is disposed between the engine part 10 and the first motor part 31 (see FIG. 4).

That is, the engine part 10, the first motor part 31, the second motor part 32 and the transmission part 50 are sequentially disposed, and the first and second damper parts 41 and 42 are disposed between the engine part 10 and the first motor part 31. The clutch part 70 which selectively connects the second motor part 32 and the transfer part 20 so as to transfer power is disposed between the first motor part 31 and the second motor part 32.

For example, the first damper part 41 and the second damper part 42 may be connected to each other in series, and each include a spring to absorb vibration when power generated by the engine part 10 and the motor part 30 is transferred.

The first damper part 41 may be directly connected to the engine part 10, and bolt-coupled to the first rotor part 61. The second damper part 42 may be connected to the first damper part 41, and spline-coupled to the outer circumferential surface of the transfer part 20 so as to transfer power. At this time, the second damper part 42 may be disposed in the first damper part 41, which makes it possible to reduce the whole length of the power transmission device.

When the first and second damper parts 41 and 42 are connected in series to each other, the overall elastic modulus K of the torsion damper part 40 is lowered. Thus, the overall stiffness can be lowered to not only reduce the weight of the power transmission device, but also improve the fuel efficiency of the hybrid vehicle.

That is, when the overall elastic modulus of the torsion damper part 40 is represented by K, the elastic modulus of the first damper part 41 is represented by K1, and the elastic modulus of the second damper part 42 is represented by K2, an elastic modulus method of a spring may be applied to derive Equation 1.

$$\frac{1}{K} = \frac{1}{K1} + \frac{1}{K2} \qquad \text{[Equation 1]}$$

Equation 1 may be used to derive Equation 2 below.

$$K = \frac{K1 \times K2}{K1 + K2} \begin{pmatrix} K < K1, \\ K < K2 \end{pmatrix} \qquad \text{[Equation 2]}$$

Since the overall elastic modulus K of the torsion damper part 40, calculated through Equation 2, is smaller than the elastic modulus K1 of the first damper part 41 and the elastic modulus K2 of the second damper part 42, the overall stiffness of the torsion damper part 40 may be lowered.

The operation of the power transmission device for a hybrid vehicle in accordance with the embodiment of the present disclosure, which has the above-described structure, will be described as follows.

When one engine part 10 and one motor part 30 are used as a power source (see FIGS. 1 and 2), the motor part 30 may be driven to rotate the rotor part 60, and the transfer part 20 connected to the clutch part 70 may transfer the rotational force of the rotor part 60 to the transmission part 50, in order to operate the vehicle.

When the engine part 10 is driven, the rotational force of the engine part 10 may be transferred to the transfer part 20 through the damper part 40, and transferred to the transmission part 50 through the clutch part 70, in order to operate the vehicle.

When one engine part 10 and two motor parts 30 are used as a power source (see FIGS. 3 and 4), the second motor part 32 may be driven to rotate the second rotor part 62, and the transfer part 20 connected to the clutch part 70 may transfer the rotational force of the second rotor part 62 to the transmission part 50, in order to operate the vehicle.

When the first motor part 31 is driven, the first rotor part 61 may be rotated, and the first damper part 41 connected to the first rotor part 61 may rotate the engine part 10 to induce a start-up of the engine part 10.

When the engine part 10 is driven, the rotational force of the engine part 10 may be transferred to the transfer part 20 through the first and second damper parts 41 and 42, and transferred to the transmission part 50 through the clutch part 70, in order to operate the vehicle.

In the power transmission device 1 for a hybrid vehicle in accordance with the embodiment of the present disclosure, the plurality of torsion damper parts 40 may be disposed between the engine part 10 and the motor part 30, which makes it possible to reduce the whole length of the power transmission device 1. Furthermore, the torsion damper part 40 may relieve shock applied to the engine part 10 and the motor part 30, thereby lowering the overall stiffness thereof.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A power transmission device for a hybrid vehicle, comprising:
    an engine;
    a shaft that transfers power of the engine;
    a motor that provides power to the shaft, and is driven when power is applied thereto;
    a plurality of torsion dampers disposed between the engine and the motor, and connected in series; and
    a transmission,
    wherein the shaft comprises a first transfer shaft directly connected to the engine, a second transfer shaft directly connected to the transmission, and a third transfer shaft disposed between the first transfer shaft and the second transfer shaft, and
    wherein the plurality of torsion dampers is disposed between the first transfer shaft and the third transfer shaft,
    wherein the motor comprises:
        a first motor driven to start the engine; and
        a second motor driven to operate the hybrid vehicle,
    wherein the power transmission device further comprises a clutch disposed between the first motor and the second motor,
    wherein the first motor is directly connected to the clutch and to the third transfer shaft, and
    wherein the second motor is directly connected to the clutch and to the second transfer shaft.

2. The power transmission device of claim 1, wherein the motor has a rotor disposed therein, and
    wherein the shaft is disposed on a rotation center axis of the rotor.

3. The power transmission device of claim 2, wherein the plurality of torsion dampers is disposed between the rotor and the first transfer shaft.

4. The power transmission device of claim 1,
   wherein the plurality of torsion dampers is disposed between the engine and the first motor.

5. The power transmission device of claim 4, wherein the first motor is disposed closer to the engine than is the second motor, and
   wherein the second motor provides a higher output than does the first motor.

6. The power transmission device of claim 1, wherein each torsion damper of the plurality of torsion dampers is a spring.

* * * * *